C. F. JOHNSTON.
PISTON RING.
APPLICATION FILED JUNE 17, 1920.
1,411,360.
Patented Apr. 4, 1922.
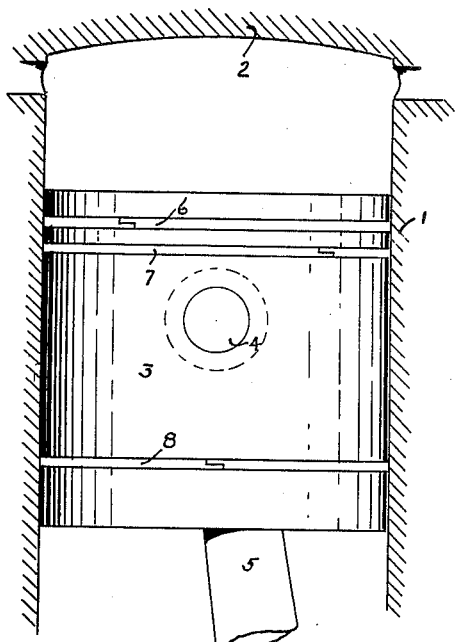
Fig 1.
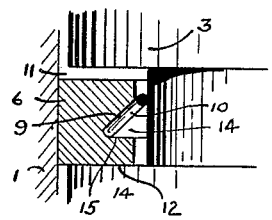
Fig 2.
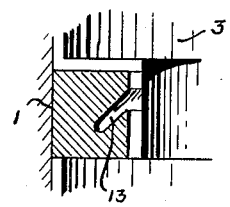
Fig 3.
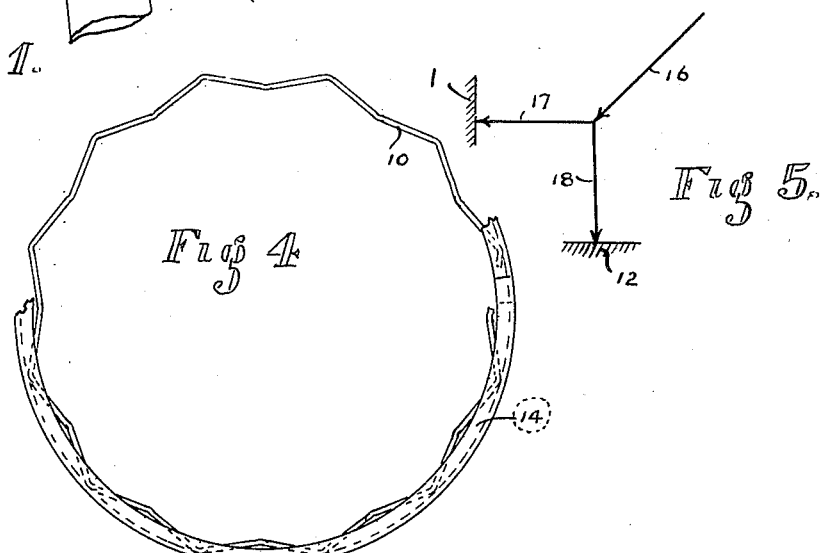
Fig 4.
Fig 5.
INVENTOR
Charles F Johnston
BY
Miller & Henry
ATTORNEYS

UNITED STATES PATENT OFFICE.

CHARLES F. JOHNSTON, OF SAN FRANCISCO, CALIFORNIA.

PISTON RING.

1,411,360. Specification of Letters Patent. Patented Apr. 4, 1922.

Application filed June 17, 1920. Serial No. 389,593.

*To all whom it may concern:*

Be it known that I, CHARLES F. JOHNSTON, a citizen of the United States, and a resident of the city and county of San Francisco, State of California, have invented new and useful Improvements in Piston Rings, of which the following is a specification.

My invention has for its object the provision of a packing ring for pistons and cylinders whereby a more perfect packing is secured between the pressure chamber and the relief, as for example, in the well known internal explosion engine to which my ring is particularly adapted, and at the same time maintaining suitable lubrication and minimum of wear. Reference is herein made to my copending application, Serial No. 270,533, filed April 1, 1920, wherein another device of a similar nature is fully set forth, and my present ring is a further improvement thereon.

Referring to the drawings the invention will be made clear.

Figure 1 illustrates a piston of any well known internal explosion engine which piston is provided with packing rings and adapted to operate within a cylinder, the latter being shown diagrammatically.

Fig. 2 is a detail enlarged view of a portion of the piston grooves and cylinder walls and having my improved ring shown therein in cross section. The clearance in this view is greatly exaggerated to more clearly indicate the action.

Fig. 3 is an alternate form of the ring similar to Fig. 2 but showing an alternate form of ring groove, the clearance in this view being greatly exaggerated to more clearly indicate the action.

Fig. 4 is a plan view of a portion of a ring with a sinuous formed spring for forcing the ring at all points to seal the space between the piston and cylinder.

Fig. 5 illustrates a force diagram applicable to Figs. 2 and 3.

Throughout the figures similar numerals refer to identical parts.

The side wall of a cylinder as in the well known internal explosion engine is indicated by the numeral 1, which is provided with a suitable top wall or cover indicated at 2. Within the cylinder is indicated the piston 3 having any suitable connection to the rotative parts of the engine, as by the crank pin 4 and crank 5, the balance of the engine being well known but not shown and forming no part of my invention.

The piston 3 is provided with packing rings as at 6—7 and 8 suitably disposed with regard to the wear and lubrication of the metallic parts.

Referring specifically to Fig. 2 wherein my ring is indicated at 6, there is provided on the inner periphery of the ring a conical shaped groove 7 having a substantially flat face 8 and an inclined wall 9. The ring is indicated as seating at 12 within the groove 11 suitably turned into the piston 3 and of a suitable depth and width. The spring member 10 (see Fig. 4) is formed of sinuous spring wire and is inserted within the groove 14 shown by the dotted lines in Fig. 4, and in the similar manner to that set forth in my copending application above mentioned, except that the groove 14 being turned with the conical face 9, as aforesaid, the spring 10 when under compression in place will spring into the position indicated in Fig. 2, forcing the piston ring 6 to compress against the surface 12 of the piston 3 in an axial direction and against the wall 1 of the cylinder in a radial or outward direction, thus sealing the ring and the cylinder and the ring and the piston against leakage.

In the alternate construction shown in Fig. 3, the same result is attained, but the groove 13 is formed with parallel and conical sides so that the spring 10 is compelled to take the angular position corresponding with that of Fig. 2. In either case the presence of the projections of the spring or the sinuous points cause a continuous contact throughout the entire ring periphery.

The form indicated in Fig. 2 is more advantageous in some cases where a sufficient amount of metal is available for the ring cross section, whereas the form indicated in Fig. 3 retains a slightly greater initial spring in the ring itself.

The method of operation is as follows. When the ring is in an operating engine, the pressure from above the piston and due to the explosion within the cylinder is retained against leakage by the ring which is held in close contact against one wall of the piston groove and against the cylinder wall. This is because of the angular direction of pressure (see Fig. 5) wherein the spring pressure both in intensity and direction is indicated by the arrow 16 and the component directions and pressures by the arrows 17 and 18 as resulting against the wall 1 and the piston groove 12 respectively.

I claim:

1. As an article of manufacture a packing ring having an angular groove cut in its inner surface in combination with a sinuous formed spring partly enclosed within said groove and partly exposed therebeyond and inside of the area of said ring.

2. A piston ring having a groove on its inner face angular to the plane of the ring, in combination with a spring member of sinuous form, the sinuous projections adapted to alternately seat within said groove and project therefrom.

3. A piston ring and spring as set forth in claim 1 in combination with a piston recessed on its periphery to receive said ring and against the bottom of the said recess the sinuous projections abut.

4. Parts as set forth in claim 3 wherein the spring is compressed between the groove and the bottom of the recess when the outer surface of the ring is flush with the surface of the piston.

5. In a piston member in cooperation with a cylinder member, a packing ring interposed therebetween and having a smooth surface for frictional engagement with one of the members and having an angular groove on the opposite surface, a sinuous spring within said groove and having points of pressure contact with the other member.

In testimony whereof, I have hereunto set my hand at San Francisco, California, this 11th day of June, 1920.

CHARLES F. JOHNSTON.

In presence of—
P. S. PIDWELL.